United States Patent
Balasubramanian et al.

(10) Patent No.: US 12,349,139 B2
(45) Date of Patent: Jul. 1, 2025

(54) METHODS FOR PROTECTING SIDELINK FEEDBACK INFORMATION

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Hong Cheng, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 17/659,303

(22) Filed: Apr. 14, 2022

(65) Prior Publication Data

US 2023/0337235 A1  Oct. 19, 2023

(51) Int. Cl.
 *H04W 60/04*  (2009.01)
 *H04L 1/1607*  (2023.01)
 *H04W 4/06*  (2009.01)
 *H04W 72/20*  (2023.01)

(52) U.S. Cl.
 CPC ........... *H04W 72/20* (2023.01); *H04L 1/1621* (2013.01); *H04W 4/06* (2013.01)

(58) Field of Classification Search
 None
 See application file for complete search history.

(56) References Cited

U.S. PATENT DOCUMENTS

2021/0250954 A1\* 8/2021 Li ........................ H04L 1/1854

\* cited by examiner

*Primary Examiner* — Gary Lafontant
(74) *Attorney, Agent, or Firm* — Patterson+ Sheridan, L.L.P.

(57) ABSTRACT

Certain aspects of the present disclosure provide a method for wireless communication at a first user equipment (UE). The method generally includes receiving, from a second UE, sidelink control information (SCI) scheduling a physical sidelink shared channel (PSSCH), determining a sequence for providing feedback for the PSSCH, from a plurality of possible sequences, based on one or more parameters, and transmitting the sequence via a physical sidelink feedback channel (PSFCH) as feedback for the PSSCH.

26 Claims, 15 Drawing Sheets

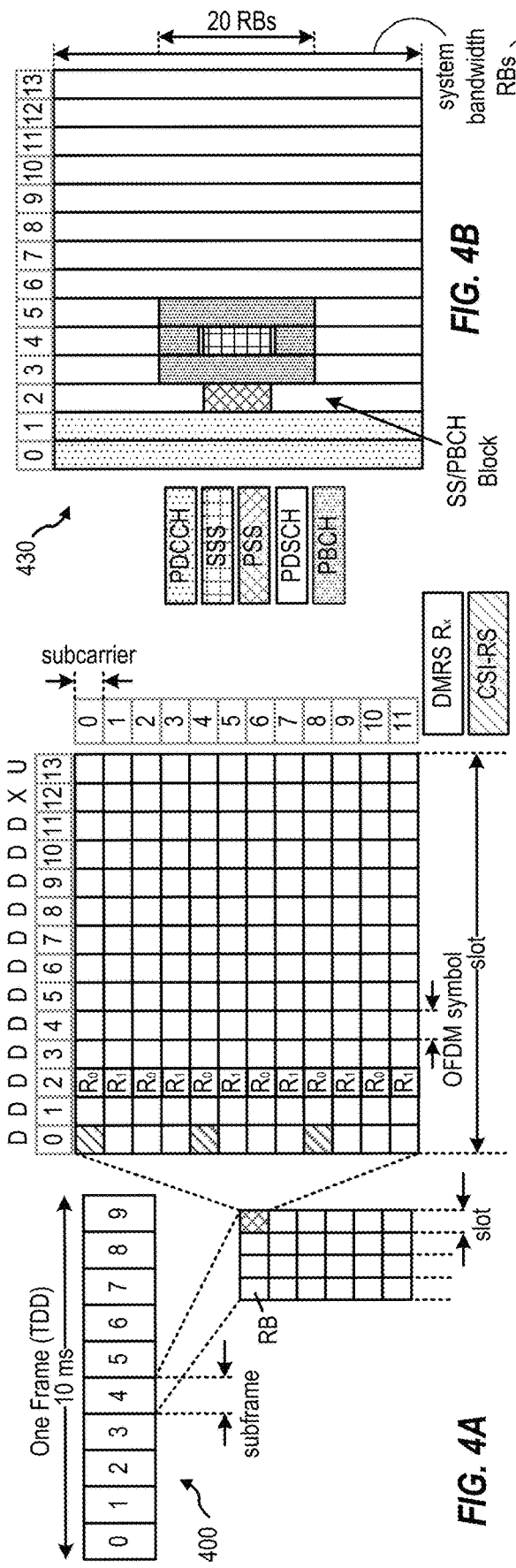
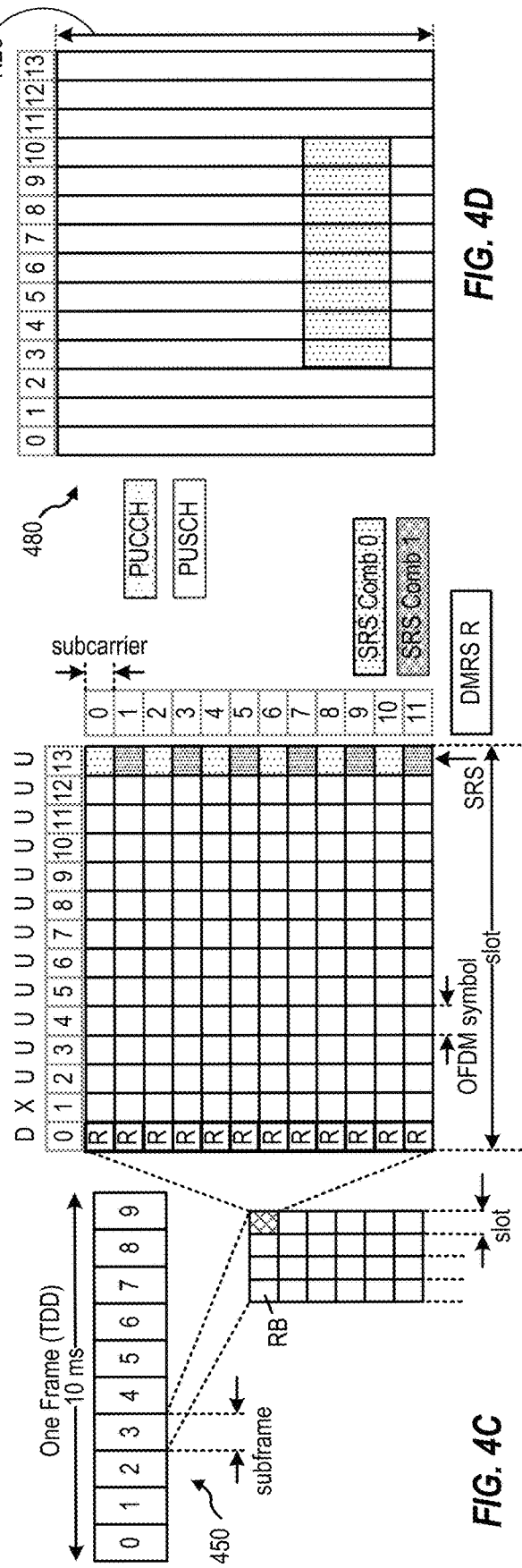

METHODS FOR PROTECTING SIDELINK FEEDBACK INFORMATION

BACKGROUND

Field of the Disclosure

Aspects of the present disclosure relate to wireless communications, and more particularly, to techniques for protecting sidelink feedback information.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a first user equipment (UE). The method includes receiving, from a second UE, sidelink control information (SCI) scheduling a physical sidelink shared channel (PSSCH); determining a sequence for providing feedback for the PSSCH, from a plurality of possible sequences, based on one or more parameters; and transmitting the sequence via a physical sidelink feedback channel (PSFCH) as feedback for the PSSCH.

Another aspect provides a method of wireless communications by second UE. The method includes transmitting, to a first UE, SCI scheduling a PSSCH; determining a sequence for receiving feedback for the PSSCH, from a plurality of possible sequences, based on one or more parameters; and monitoring a PSFCH for the sequence as feedback for the PSSCH.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for protecting sidelink feedback information.

Some current new radio (NR) sidelink (SL) systems (e.g., Rel-16 & below) enable user equipment (UE) feedback for various types of SL transmissions (e.g., unicast, connected, and connectionless groupcast transmissions). The feedback is transmitted in a feedback channel, such as a physical sidelink feedback channel (PSFCH).

In some systems (e.g., Rel-16), devices learn of the resources to use (or monitor) for transmitting PSFCH based on a mapping between resources used for physical sidelink shared channel (PSSCH) transmissions and PSFCH resources. In other words, based on this mapping, a receiver UE will know what resources to use for transmitting feedback and a transmitter UE will know what resources to monitor for feedback based on the resource used to transmit data.

Unfortunately, this also creates an opportunity for an attack, in the form of transmitting fake or false feedback. In other words, an unintended receiver (referred to as an eavesdropper or spoofer) may also be able to infer the feedback resource that the transmitter is expecting feedback on, based on the mapping and the resource used to transmit data. It is thus possible that the feedback can be spoofed by the eavesdropper. In other words, the eavesdropper may send fake feedback that could cause disruption. For example, spoofed feedback could falsely indicate that a transmission was not received, leading to unnecessary retransmissions, a waste of system resources, and increased latency.

Aspects of the present disclosure, however, provide mechanisms that may help protect against spoofed feedback. As will be described in greater detail below, in some cases, a key index may be used to select sequences used for acknowledgment (ACK) and negative acknowledgment (NAK) feedback. Without knowledge of the key index, an eavesdropper may not be able to recreate (and fake) the feedback. Thus, aspects of the present disclosure may help thwart spoofed feedback attacks, prevent unnecessary retransmissions, and the corresponding waste of system resources.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
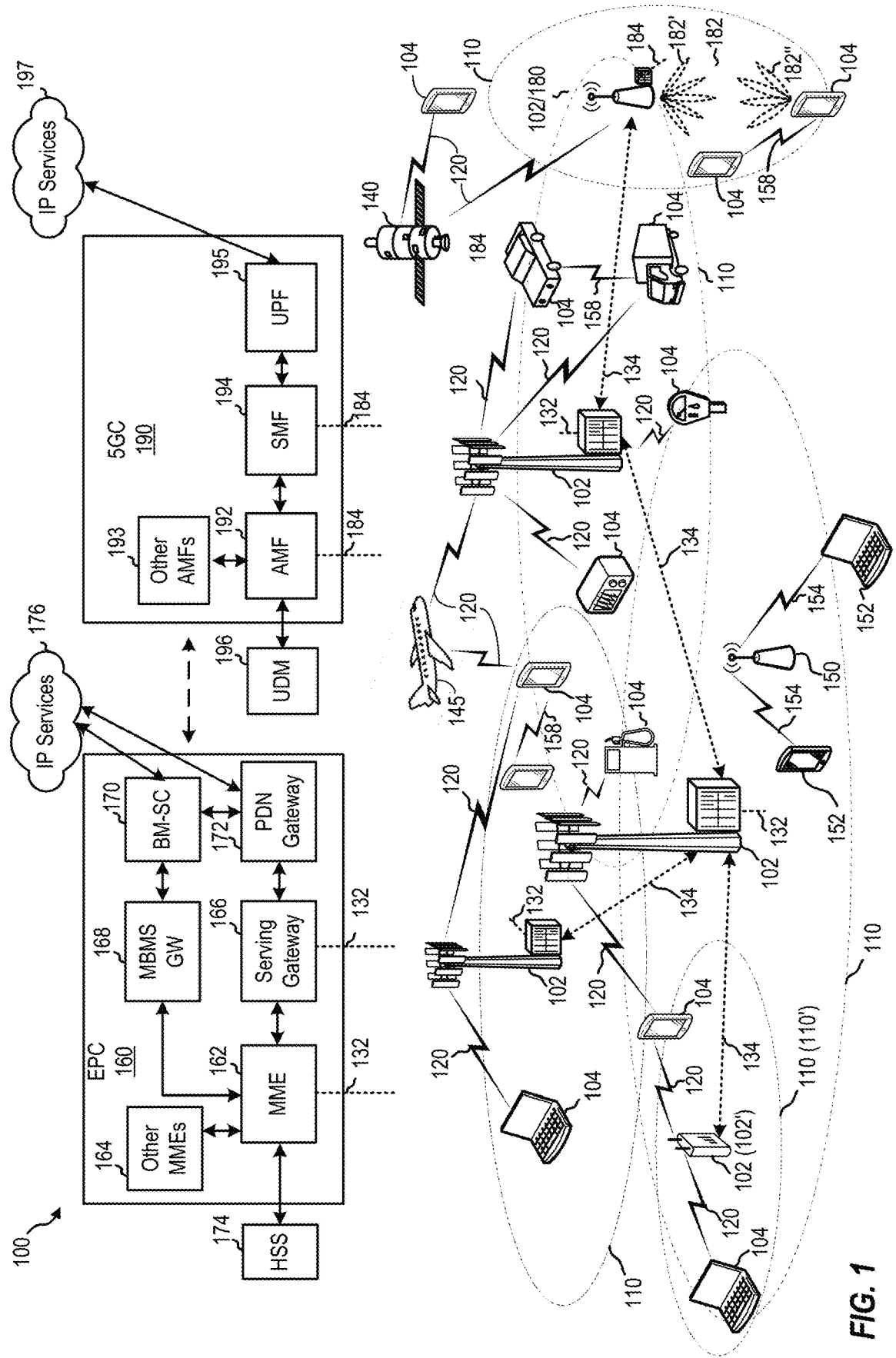
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, control portion of a vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
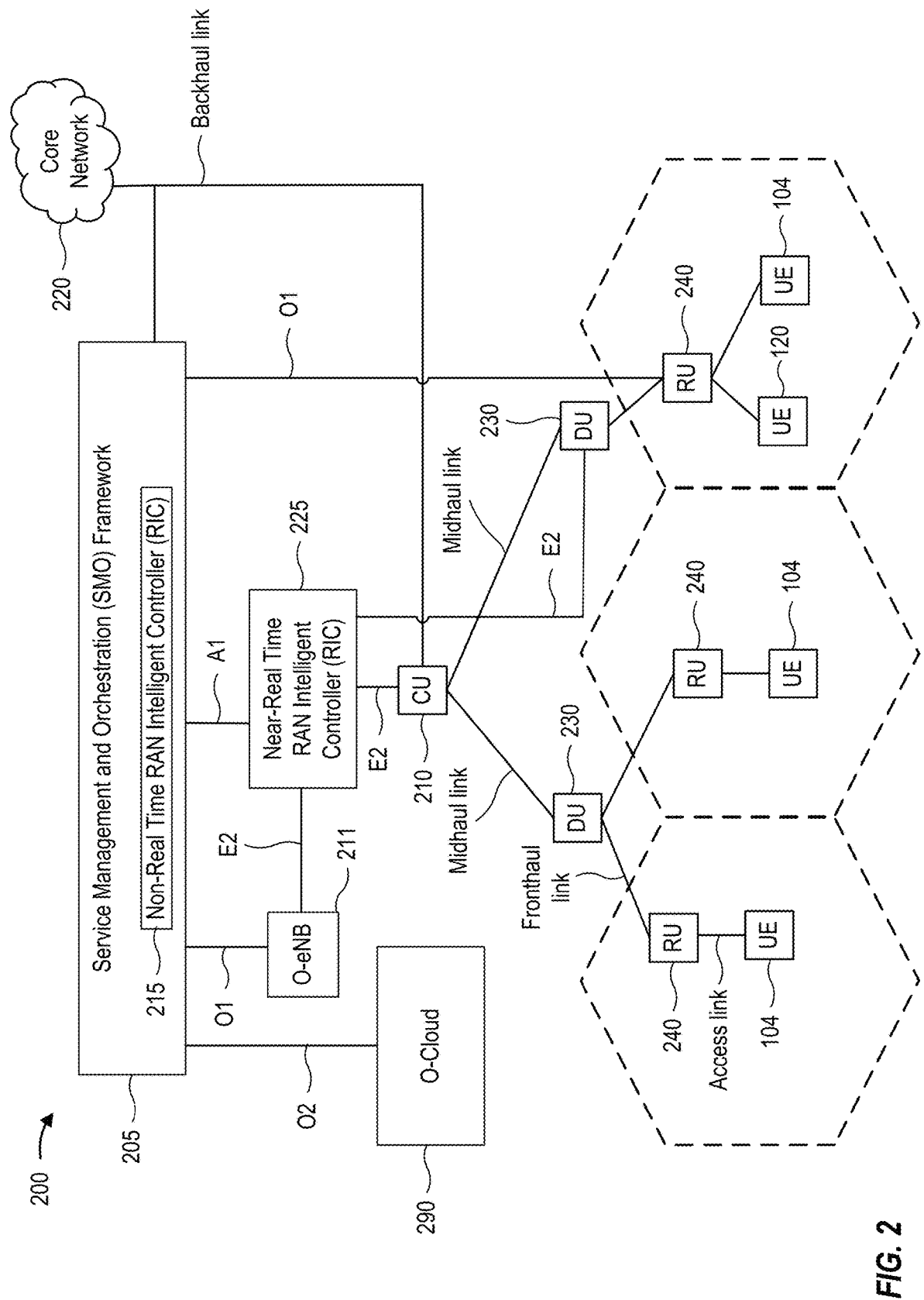
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT MC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
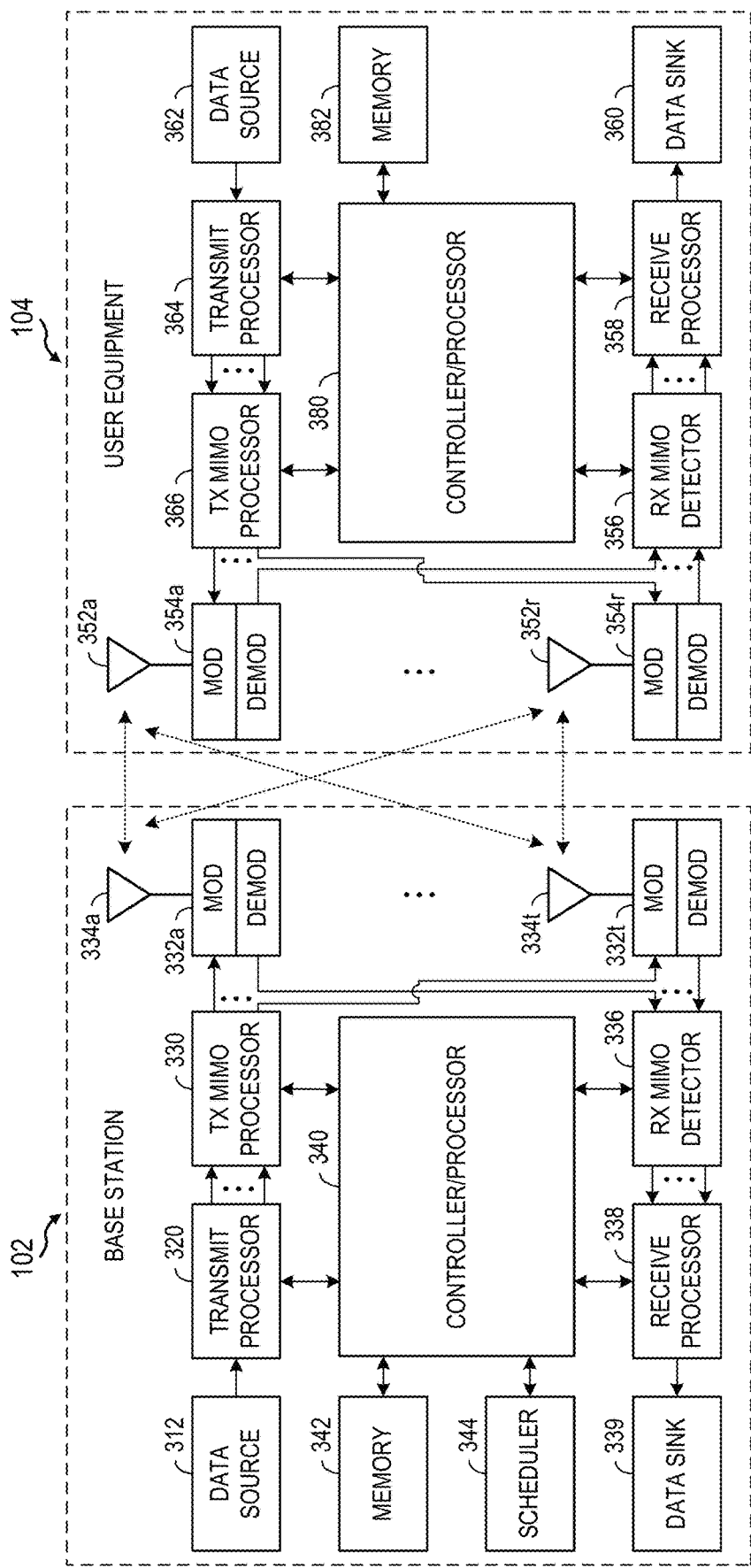
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Sidelink Communication

User equipments (UEs) communicate with each other using sidelink signals. Real-world applications of sidelink communications may include UE-to-network relaying, vehicle-to-vehicle (V2V) communications, vehicle-to-everything (V2X) communications, Internet of Everything (IoE) communications, IoT communications, mission-critical mesh, and/or various other suitable applications.

A sidelink signal refers to a signal communicated from one UE to another UE without relaying that communication through a scheduling entity (e.g., UE or a network entity), even though the scheduling entity may be utilized for scheduling and/or control purposes. In some examples, the sidelink signal is communicated using a licensed spectrum (e.g., unlike wireless local area networks, which typically use an unlicensed spectrum). One example of sidelink communication is PC5, for example, as used in V2V, long term evolution (LTE), and/or new radio (NR).

Various sidelink channels are used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH carries discovery expressions that enable proximal UEs to discover each other. The PSCCH carries control signaling such as sidelink resource configurations, resource reservations, and other parameters used for data transmissions. The PSSCH carries data transmissions. The PSFCH carries a feedback such as acknowledgement (ACK) and/or negative ACK (NACK) information corresponding to transmissions on the PSSCH.

In some NR systems, a two stage sidelink control information (SCI) is supported. The two stage SCI includes a first stage SCI (e.g., SCI-1) and a second stage SCI (e.g., SCI-2). The SCI-1 includes resource reservation and allocation information. The SCI-2 includes information that can be used to decode data and to determine whether a UE is an intended recipient of a transmission. The SCI-1 and/or the SCI-2 may be transmitted over a PSCCH.

Figure 5B:
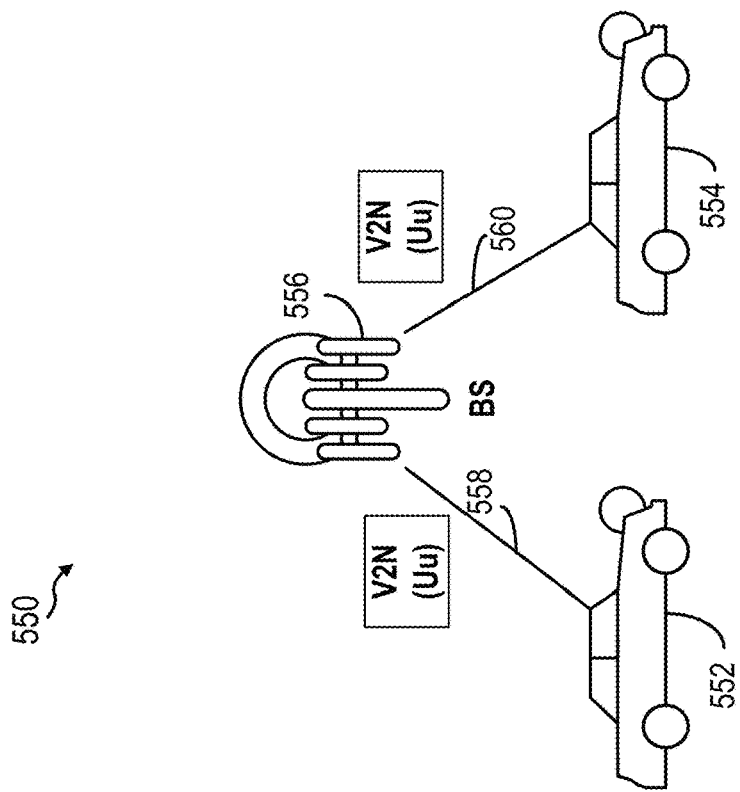
FIGS. 5A-5B depict diagrammatic representations of example vehicle-to-everything (V2X) systems.
Figure 5A:
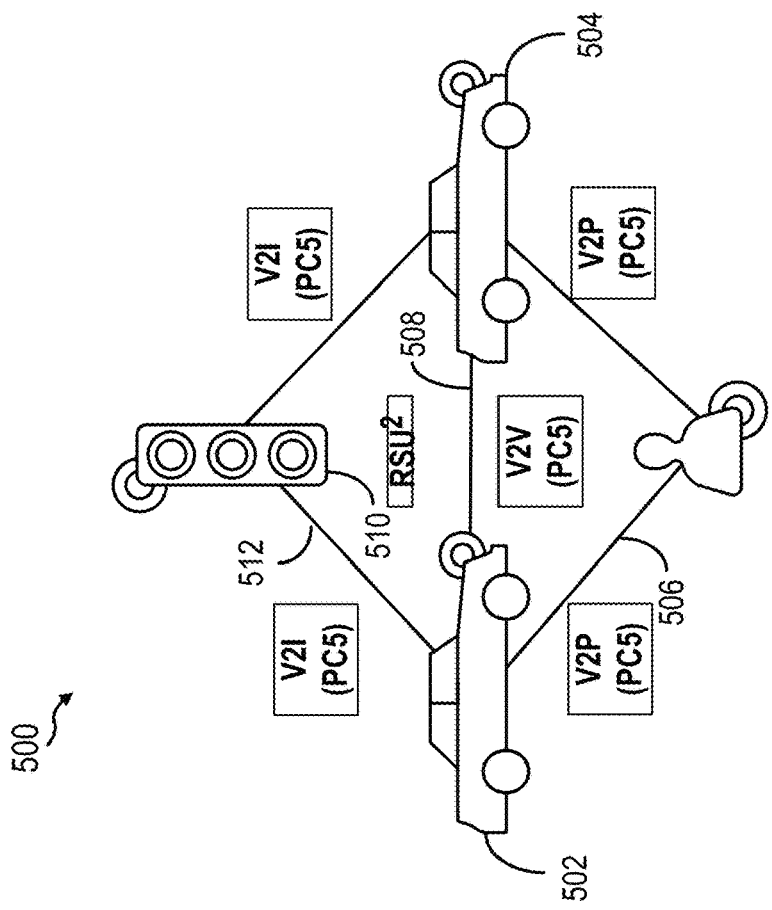

FIG. 5A and FIG. 5B show diagrammatic representations of example V2X systems. For example, vehicles shown in FIG. 5A and FIG. 5B communicate via sidelink channels and relay sidelink transmissions. V2X is a vehicular technology system that enables vehicles to communicate with traffic and an environment around them using short-range wireless signals, known as sidelink signals.

The V2X systems shown in FIG. 5A and FIG. 5B provide two complementary transmission modes. A first transmission mode, shown by way of example in FIG. 5A, involves direct communications (e.g., also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (e.g., including V2V communications) is illustrated with two vehicles 502, 504. A first transmission mode allows for direct communication between different participants in a given geographic location. As illustrated, a vehicle 502 can have a wireless communication link 506 with an individual through a PC5 interface. Communications between the vehicles 502 and 504 may also occur through a PC5 interface 508. In a like manner, communication may occur from the vehicle 502 to other highway components (e.g., a roadside unit (RSU) 510), such as a traffic signal or sign through a PC5 interface 512. With respect to each communication link illustrated in FIG. 5A, two-way communication may take place between devices, therefore each device may be a transmitter and a receiver of information. The V2X system 500 is a self-managed system implemented without assistance from a network entity. A self-managed system may enable improved spectral efficiency, reduced cost, and increased reliability as network service interruptions do not occur during handover operations for moving vehicles. The V2X system 500 is configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. Network communications may occur through discrete nodes, such as a network entity 556 that sends and receives information to and from (e.g., relays information between) the vehicles 552, 554. The network communications through vehicle to network (V2N) links 558 and 560 may be used, for example, for long-range communications between the vehicles 552, 554, such as for communicating the presence of a car accident a distance ahead along a road or highway. Other types of communications may be sent by a wireless node to the vehicles 552, 554, such as traffic flow conditions, road hazard warnings, environmental/weather reports, and service station availability, among other examples. Such data can be obtained from cloud-based sharing services.

Example Vehicle-to-Everything (V2X) Focused
New Radio (NR) Sidelink and Sidelink Unlicensed One example of a sidelink scenarios is a new radio (NR) sidelink system used for vehicle-to-everything (V2X) communications to exchange short and sparse messages among vehicular user equipments (UEs) (e.g., over sub-7 GHz intelligent transport systems (ITS)/licensed bands).

In the NR sidelink system, two channel access/resource allocation modes (e.g., Mode 1 and Mode 2) are specified. The Mode 1 is specified for in-coverage deployment where a sidelink UE receives a grant from a gNodeB (gNB) for a centralized channel access. The Mode 2 is specified for autonomous deployment where a sidelink UE performs sensing-and-reservation based distributed channel access.

In some cases, sidelink resources in the NR sidelink system are arranged to support orthogonal frequency division multiple access (OFDMA) (e.g., using "subchannel× slot" as granularity). In some cases, a subchannel can be pre-configured (e.g., to be of 10 resource block (RB), 12RB, 15RB, 20RB, 25RB, 50RB, 75RB, or 100RB). Also, for a given resource pool, a relatively small subchannel size may help in suppressing collision when traffics are dominated by small transport blocks (TBs), and a rare and large TB can be carried by simultaneously transmitting over adjacent subchannels.

Figure 6:
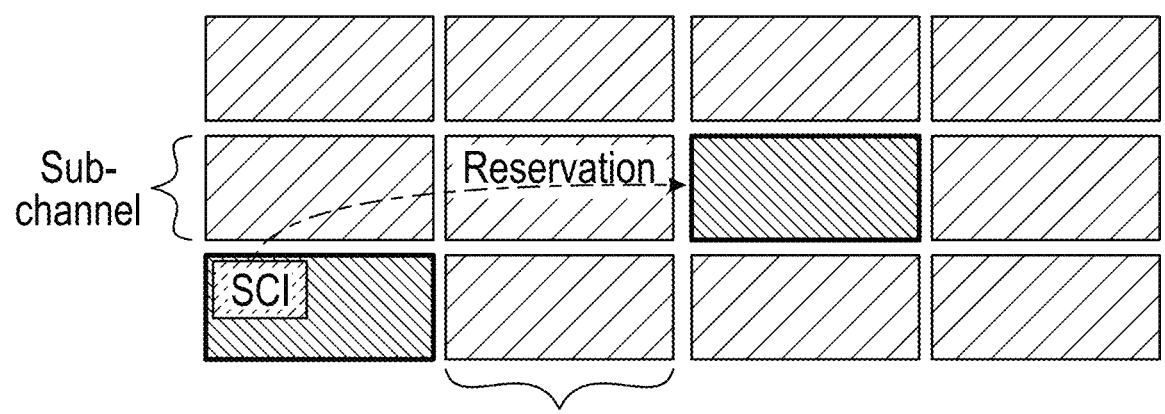
FIG. 6 depicts example subchannels and slots.

In some cases, as illustrated in FIG. 6, a sidelink UE carries a codepoint in a sidelink control information (SCI) to reserve a future sidelink resource for a retransmission (e.g., a dynamic reservation) or a new transmission (e.g., a periodical reservation). A sensing UE (e.g., when operating in the Mode 2) may decode the received SCI in its sensing window and perform collision avoidance accordingly.

In some cases, a discontinuous reception (DRX) in the NR is specified for battery-powered UEs, and inter-UE coordination is specified for a higher reliability in the Mode 2. In addition, sidelink applications have been limited to sub-7 GHz licensed/ITS bands, and not every sidelink application can access to sub-7 GHz licensed/ITS bands.

In some cases, a sidelink may be deployed over other bands. For example, the sidelink may be deployed on a frequency range 1 (FR1) unlicensed spectrum for both the Mode 1 and the Mode 2 where Uu operation for the Mode 1 is limited to a licensed spectrum (e.g., with possible scope of evaluation methodology for a sidelink operation on the unlicensed spectrum, a sidelink channel access mechanism for the unlicensed spectrum, and/or required changes to channel structures and procedures to operate on the unlicensed spectrum).

The present disclosure considers utilization of sidelink unlicensed (SL-U) over a FR1 unlicensed band with a listen before talk (LBT) procedure, and determines how to facilitate resource reservation with respect to a cyclic prefix (CP) extension (CPE) based channel access to improve spectral efficiency (e.g., especially for carrying enhanced mobile broadband (eMBB) type burst traffic).

Figure 7:
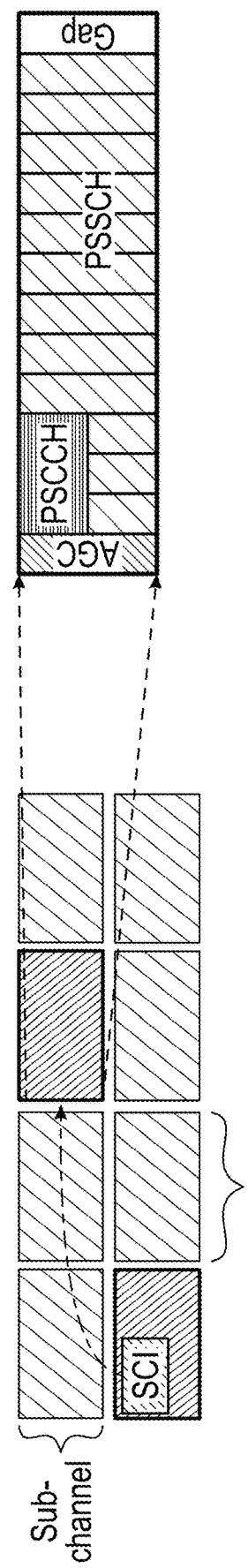
FIG. 7 depicts example reservation of resource for a sidelink transmission via a sidelink control information (SCI).

In some cases, a LBT procedure is facilitated for co-existence with other radio access technologies (RATs) to specify a NR unlicensed (NR-U). For example, reusing mechanisms are developed for intra-RAT resource allocations and performing the LBT procedure (e.g., when accessing allocated resources for inter-RAT co-existence). This leads to simultaneous transmission at a slot boundary (i.e., an automatic gain control (AGC) symbol per legacy) and simultaneously keeping silence in a last "gap" symbol (e.g., as illustrated in FIG. 7) for a channel clearance assessment (CCA). Such reusing mechanisms can be used for V2X communications.

In some cases, when a size of a subchannel is large enough for a considered TB (e.g., for carrying relatively small packets in the V2X communications), frequency division multiplexed (FDMed) subchannels can effectively reduce a probability of collisions of simultaneous channel access attempts (e.g., when system loading is moderate). Furthermore, a periodicity of the V2X communications traffic can be leveraged by a reservation mechanism to further suppress collision. However, typical eMBB traffic is neither of a small TB size nor with the periodicity.

Overview of PSFCH Resource Mapping

Figure 8A:
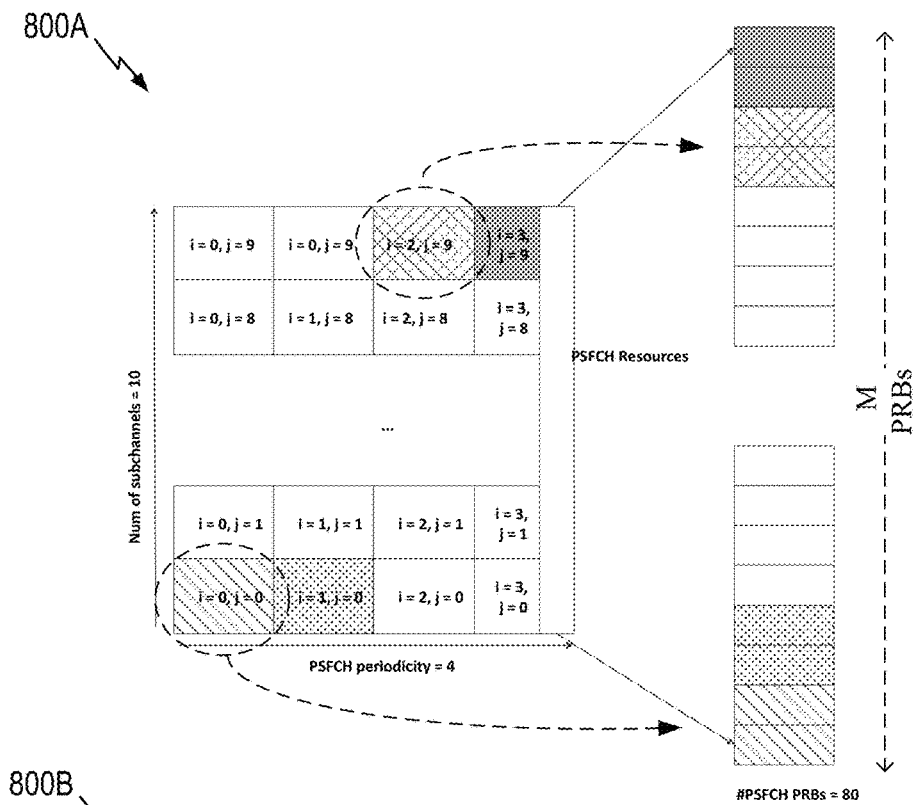
FIGS. 8A and 8B depict examples of physical sidelink feedback shared channel (PSFCH) resource mapping, according to various aspects described herein.
Figure 8B:
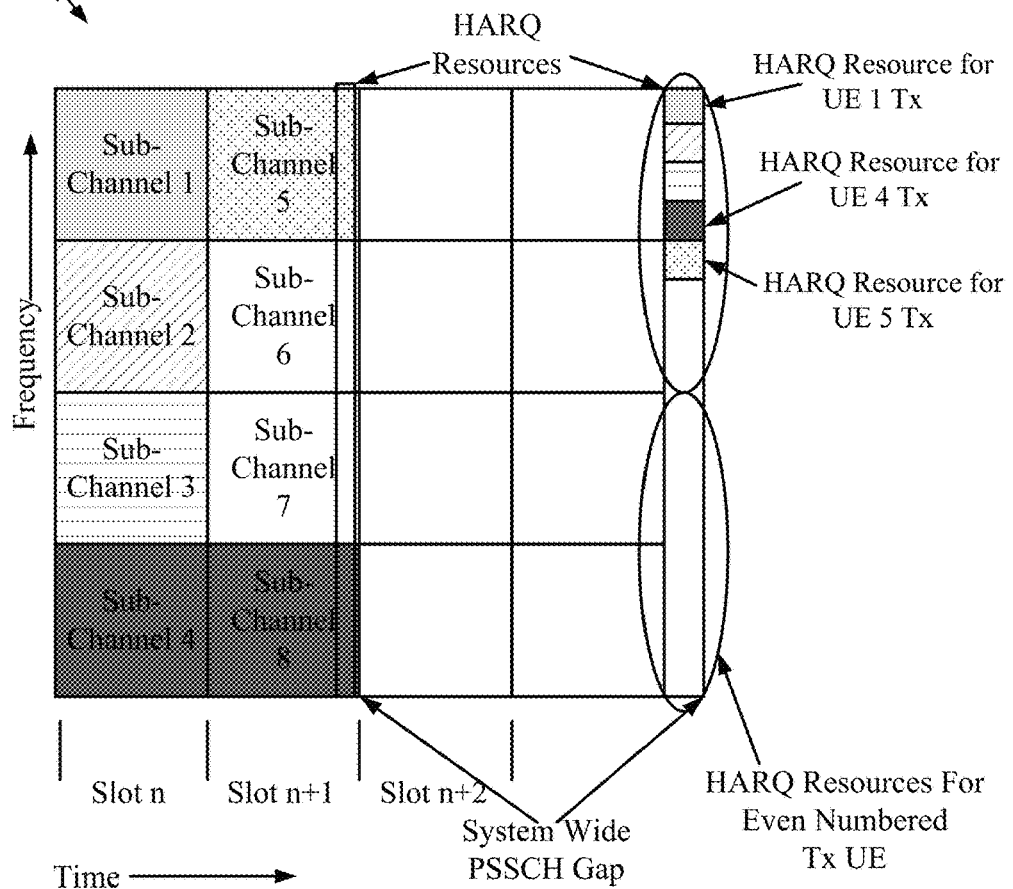

FIG. 8B is an example of how resources of a common resource pool 800B may be allocated for sidelink communications (broadcast and groupcast device-to-device or D2D) between UEs (e.g., UEs 104 shown in FIG. 1). The common resource pool 800B includes slots and subchannels. Resources may be allocated as combinations of subchannels and slots, used for physical sidelink shared channel (PSSCH) transmissions. In the illustrated example, PSSCH is allocated one slot (slot i) and one sub-channel (j).

As noted above, PSSCH may be mapped to physical sidelink feedback channel (PSFCH) resources. In general, there is a mapping between a PSSCH and the corresponding PSFCH resource based on the starting sub-channel of PSSCH (sl-PSFCH-CandidateResourceType is configured as startSubCH). The mapping could also be based on the number of subchannels in a PSSCH (sl-PSFCH-CandidateResourceType is configured as allocSubCH), the slot containing PSSCH, the source ID, and the destination ID. The number of available PSFCH resources may be dictated by the number of UEs or UE pairs sharing the resource pool 800A (e.g., the number of UEs in groupcast option 2).

In the example illustrated in FIG. 8A, PSFCH resource determination is based on a mapping of subchannels/slots (i,j). In general, a UE may allocate physical resource blocks (PRBs) from $M_{PRB,set}^{PSFCH}$ PRBs to slot i and sub-channel j of resource pool 800A (allocated for PSSCH transmissions), as follows:

$$[(i+j \cdot N_{PSSCH}^{PSFCH}) \cdot M_{subch,slot}^{PSFCH}, (i+1+ j \cdot N_{PSSCH}^{PSFCH}) \cdot M_{subch,slot}^{PSFCH} - 1],$$

PRBs from $M_{PRB,set}^{PSFCH}$ PRBs to slot i and sub-channel j, where i is between 0 and the PSFCH periodicity $N_{PSSCH}^{PSFCH}$ and j is between 0 and the total number of sub-channels $N_{subch}$:

$$0 \leq i \leq N_{PSSCH}^{PSFCH} \text{ and } 0 \leq j \leq N_{subch}.$$

In the illustrated example, $N_{PSSCH}^{PSFCH}=4$ and $N_{subch}=10$, and the total number of PRBs for PSFCH is 80, so the number of PSFCH PRBs per PSFCH is 2:

$$M_{subch,slot}^{PSFCH} = N_{PSFCH\_PRBs}(N_{PSSCH}^{PSFCH} * N_{subch})$$
$$=80/(4*10)=2.$$

In other words, in this example, each PSSCH slot/sub-channel is associated with 2 PSFCH PRBs (though PSFCH may be only sent on one of them).

Example Methods for Protecting Sidelink Feedback Information

As noted above, current systems (e.g., NR Rel-16 & below) enable user equipment (UE) feedback for (unicast, connected, and connectionless groupcast) sidelink transmissions, via a physical sidelink feedback channel (PSFCH). Sidelink devices learn of the PSFCH resources based on a mapping between the PSSCH resources and PSFCH resources.

Based on this mapping, based on this mapping, a transmitter UE will know what resources to monitor for feedback based on the resource (e.g., slots and sub-channels) used to transmit data. In other words, the receiver UE transmits its feedback on a resource based on the subchannel on which it receives the data (PSSCH), and the transmit ID of the UE (which it may infer from the received SCI). This basic idea is described above and also shown in FIG. 8B, which illustrates another example mapping of (different slot and subchannel) resources used for PSSCH transmissions by different UEs to PSFCH hybrid automatic repeat request (HARQ) resources. As illustrated, the HARQ resources may be located in a system wide gap between PSSCH resources.

Certain systems (e.g., Rel-16) support sequence-based feedback, where defined sequences are transmitted as feedback (on resources determined by the mapping). For example, a first sequence may be used to indicate a positive acknowledgement (ACK), while a second sequence (e.g., a cyclic shift of the first sequence) may be used to indicate a negative acknowledgement (NACK).

As noted above, one potential drawback to this mapping mechanism is it leaves the feedback channel vulnerable to attacks at the physical (PHY) layer. In other words, any SL UE (capable of decoding SCI) may infer the feedback resource (e.g., that the transmitter UE is expecting to receive feedback on) from the information provided by the transmitted SCI. Moreover, the ACK/NACK feedback sequences are typically the same for all UEs. As a result, it is possible for an eavesdropper UE (a spoofer) to infer the feedback resource and spoof feedback (transmitting false feedback).

Figure 9:
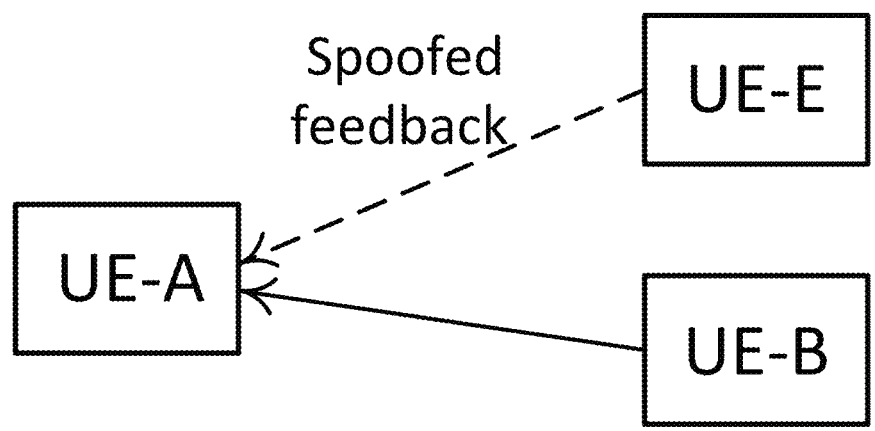
FIG. 9 depicts an example scenario in which an entity transmits fake/false feedback.

FIG. 9 illustrates an example of such a feedback spoofing attack. In the example, an eavesdropper UE-E may listen to the legitimate transmitter UE-A and infer the source ID of UE-A from the SCI transmitted by UE-A. UE-E may already be aware of the subchannel in which UE-A is transmitting, and is able to determine the feedback resource on which UE-A expects to receive feedback. UE-E may therefore spoof feedback on the feedback resource, as shown in FIG. 9. Even if UE-E does not know the feedback sequence, it may be able to infer it by observing feedback transmitted by one or more other UEs (not shown).

As noted above, such feedback spoofing attacks may interfere with the feedback sent by the intended receiver UE (e.g., UE-B), and may cause the transmitter UE (e.g., UE-A) to initiate unnecessary retransmissions (e.g., when UE-B received the transmission but UE-A retransmits in response to a false NACK received from UE-E).

Aspects of the present disclosure provide mechanisms that may help prevent or avoid or detect spoofing feedback attacks, by configuring SL UEs with multiple feedback sequences. In some cases, a key index may be used to select which of the sequences are used for ACK and NAK feedback. Without knowledge of the key index, an eavesdropper may not be able to recreate (and fake) the feedback.

Figure 10:
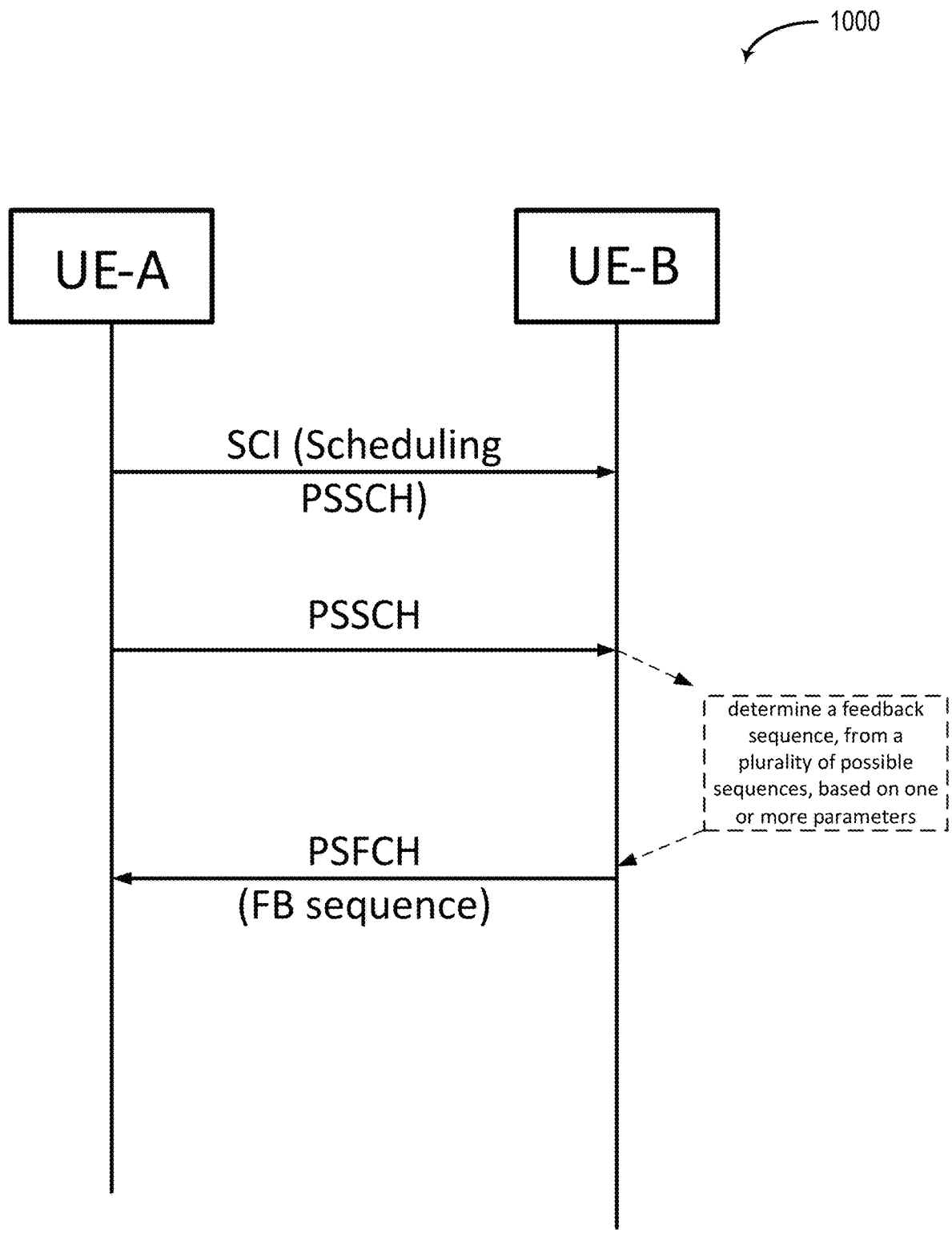
FIG. 10 is an example call flow diagram depicting a mechanism for protecting against fake/false feedback, according to various aspects described herein.

The mechanisms proposed herein may be understood with reference to the call flow diagram 1000 of FIG. 10. In the illustrated example, a first UE (e.g., a receive SL UE-B) receives, from a second UE (e.g., a transmitter SL UE-A), SCI scheduling a PSSCH. As illustrated, UE-B may determine a sequence for providing feedback for the PSSCH, from a plurality of possible sequences, based on one or more parameters. UE-B may then transmit the determined sequence via a PSFCH as feedback for the PSSCH. The PSFCH resources may be determined based on a mapping from the resources used to transmit the PSSCH (indicated in SCI).

In some examples, the one or more parameters used to determine the feedback sequence may be explicitly signaled. In some other examples, the one or more parameters may be implicitly determined based on information indicated in SCI.

The receiver UE may then derive the possible feedback sequences using methods described in more detail below. For example, in some cases, the receiver UE may determine a base sequence based on the one or more parameters. The receiver UE may also cyclically shift the base sequence to derive the appropriate feedback sequence (e.g., an ACK or NACK) based on the one or more parameters.

In certain aspects, multiple feedback sequences may be defined for unicast, groupcast applications. The sequences may be, for example, Zadoff-Chu sequences or any other appropriate type of sequence. Each sequence may be defined by a key index k. In some cases, a transmitter UE may explicitly or implicitly signal the key index k in SCI sent to the receiver UE. The receiver UE may use the sequence corresponding to the requested key index k for providing ACK (or NACK) feedback, and may use a cyclically shifted version of the sequence for providing NACK (or ACK) feedback.

In some aspects, a preconfigured list or table of feedback key indices and corresponding sequences may be determined based on a public land mobile network (PLMN) and/or a zone identifier (zone ID) associated with the receiver UE.

In some aspects, the receiver UE may derive the sequence to be used for feedback based on one or more of: the key index k provided by the transmitter UE, a source ID of the transmitter UE, and the subchannel used by transmitter UE to transmit data to the receiver UE.

In one example aspect, the length n of the feedback sequence may be determined based on the equation n=(source ID of the transmitter UE) mod N, where N is a preconfigured maximum sequence length that can be supported. Then, the actual feedback sequence used for NACK (or ACK) feedback may be the selected base sequence (of length n selected previously) cyclically shifted by the key index k provided by the transmitter UE. Additionally, the feedback sequence used for ACK (NACK) feedback may be the selected base sequence cyclically shifted by a value equal to the key index plus one (e.g., k+1).

In another example aspect, the length n of the feedback sequence may be determined based on the equation n=(key index k) mod N, where N is a preconfigured maximum sequence length that can be supported. Then, the actual feedback sequence used for NACK (or ACK) feedback may be the selected base sequence (of length n selected previously) cyclically shifted by the source ID of the transmitter UE. Additionally, the feedback sequence used for ACK (NACK) feedback may be the selected base sequence cyclically shifted by a value equal to the source ID plus one (e.g., source ID+1).

In some aspects, for SL UEs communicating in a connected groupcast session, the group identifier (group ID) of the groupcast session and/or the key index k may be used to implicitly determine the feedback sequence that groupcast members use for generating feedback. For example, because the Group ID is known only to the members of the groupcast session, the groupcast members can securely and autonomously derive and use the feedback sequence.

In another example, a first UE that is a member of the groupcast session may transmit the key index k in SCI to a second UE that is also a member of the groupcast session. In this case, the second UE may choose a base feedback sequence with a length determined based on the group ID. Then, the actual feedback sequence used for NACK (or ACK) feedback may be the selected base sequence (of length n selected previously) cyclically shifted by the key index k provided by the transmitter UE. Additionally, the feedback sequence used for ACK (NACK) feedback may be the selected base sequence cyclically shifted by a value equal to the key index plus one (e.g., k+1).

In yet another example, the second UE may choose a base feedback sequence with a length determined based on the key index k. Then, the actual feedback sequence used for NACK (or ACK) feedback may be the selected base sequence (of length n selected previously) cyclically shifted by the group ID. Additionally, the feedback sequence used for ACK (NACK) feedback may be the selected base sequence cyclically shifted by a value equal to the group ID plus one (e.g., group ID+1).

According to certain aspects, the feedback sequence (or the cyclic shift used for generating the feedback sequence from a preconfigured base sequence) may depend on one or more of the complete source or destination Layer-2 identifier (Layer-2 ID). The source or destination Layer-2 IDs typically each have 24 bits. In some aspects, only the last 8 bits (e.g., the 8 least significant bits LSBs) of the Layer-2 source ID or the last 16 bits (e.g., the 16 LSBs) of the Layer-2 destination ID is used in transmission of SCI at the physical layer. Accordingly, the remaining bits (e.g., the 16 most significant bits of the Layer-2 source ID, or the most significant 8 bits of the Layer-2 destination ID) may be used to generate the ACK/NACK feedback sequence (or the cyclic shift), which should be unknown to an eavesdropper UE.

In some aspects, for UEs in a unicast session, feedback sequences may be derived based on the nonce provided by a transmitter UE (e.g., using RRC) and a shared sidelink key $K_{SL}$. In some examples, all legal UEs in the system may be preconfigured with the sidelink key $K_{SL}$.

Figure 11:
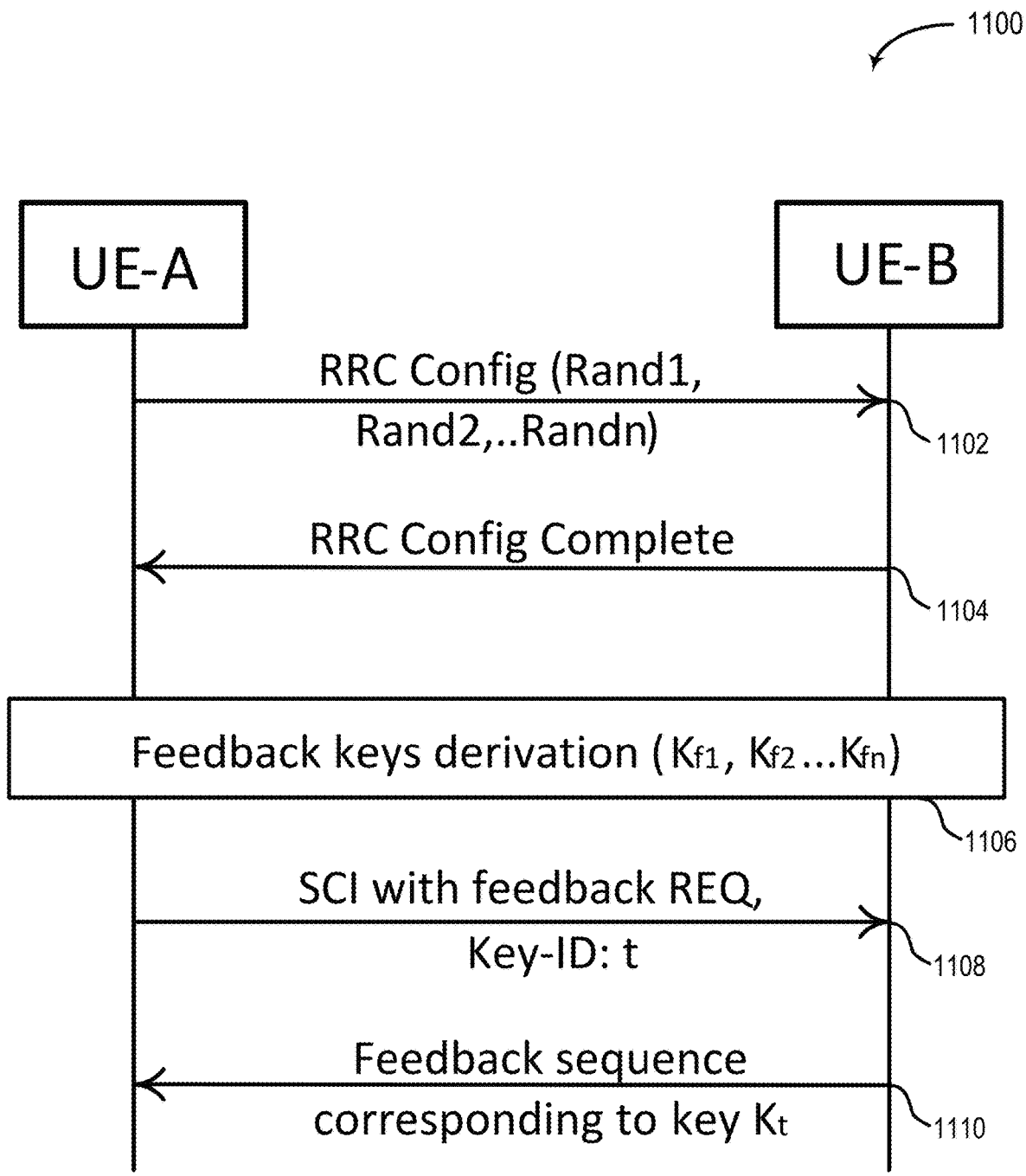
FIG. 11 is an example call flow diagram depicting a mechanism for protecting against fake/false feedback, according to various aspects described herein.

FIG. 11 illustrates an example call flow diagram 1100 for feedback sequence configuration and derivation.

As shown, at 1102, UE-A may transmit a list of randomly generated numbers Rand={Rand1, Rand2, . . . , Randn} to UE-B. At 1104, UE-B may transmit an RRC configuration complete message. At 1106, UE-A and UE-B may derive a set of n keys (Kf1, Kf2, . . . , Kfn) based on the randomly generated numbers. For example, the feedback keys may be defined as Kfi=f (KSL, Randi), where ƒ is a function and i=1, 2, 3, . . . , n.

After the feedback key derivation, at 1108, UE-A may send SCI including a key identifier (key ID) that represents the feedback sequence associated with one of the keys in the list {Kfi}. UE-B may therefore determine the feedback sequence and use that sequence to send feedback at 1110 (e.g., in a PSFCH resource).

In some aspects, for connected groupcast sessions, a UE designated as the "master UE" may provide the nonce to all the members of the connected groupcast session. The members may then be able to derive the feedback sequences (e.g., using the method described with respect to FIG. 11).

Example Operations

Figure 12:
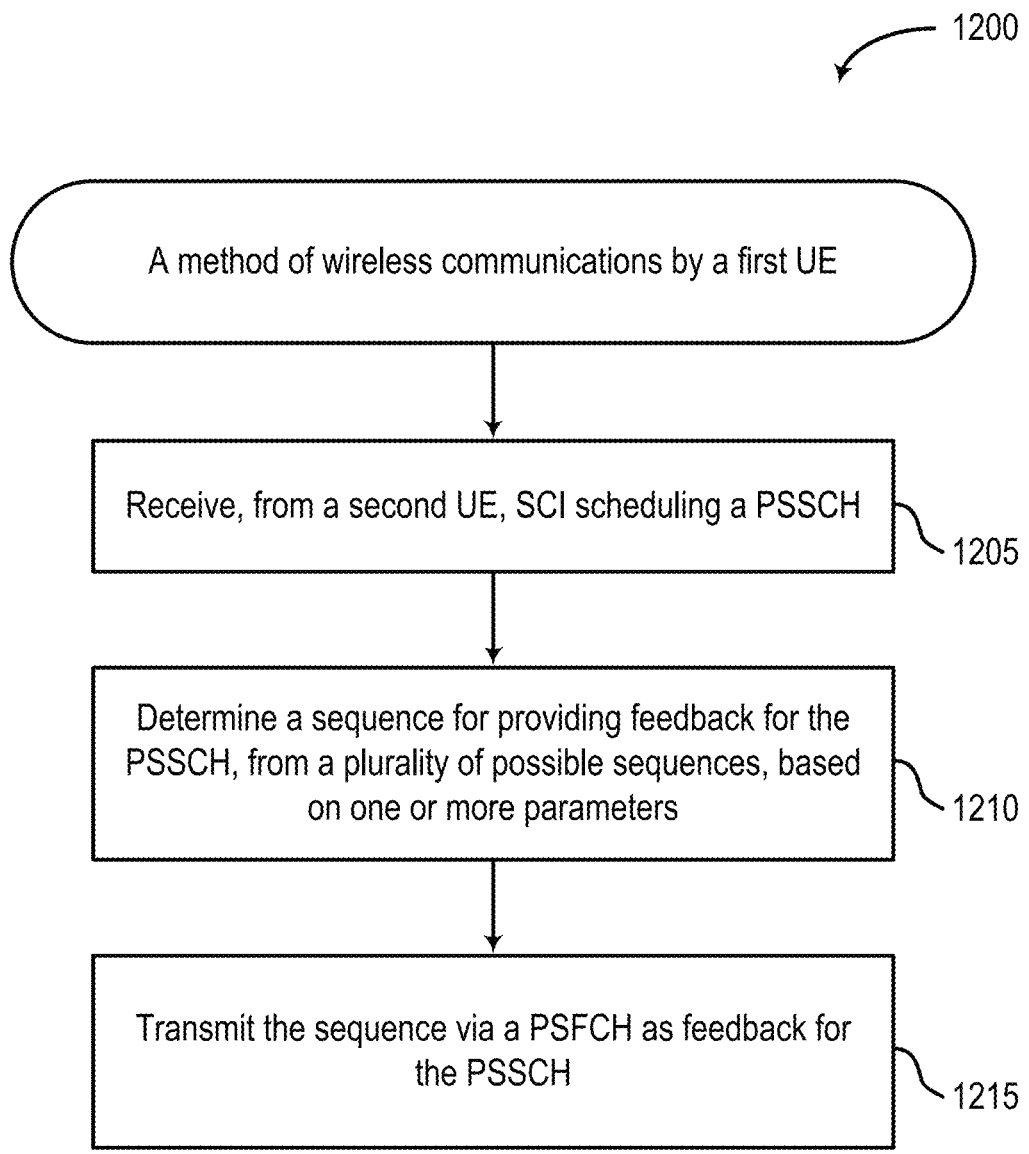
FIG. 12 depicts a method for wireless communications.

FIG. 12 shows a method 1200 for wireless communications by a first UE, such as UE 104 of FIGS. 1 and 3.

Method 1200 begins at 1205 with receiving, from a second UE, SCI scheduling a PSSCH. In some cases, the operations of this step refer to, or may be performed by, SCI reception circuitry and/or SCI reception code as described with reference to FIG. 14.

Method 1200 then proceeds to step 1210 with determining a sequence for providing feedback for the PSSCH, from a plurality of possible sequences, based on one or more parameters. In some cases, the operations of this step refer to, or may be performed by, feedback sequence processing circuitry and/or feedback sequence processing code as described with reference to FIG. 14.

Method 1200 then proceeds to step 1215 with transmitting the sequence via a PSFCH as feedback for the PSSCH. In some cases, the operations of this step refer to, or may be performed by, PSSCH feedback circuitry and/or PSSCH feedback code as described with reference to FIG. 14.

In some aspects, a sequence provided as negative acknowledgment feedback for the PSSCH is a cyclically shifted version of a sequence provided as positive acknowledgment feedback for the PSSCH.

In some aspects, the one or more parameters comprises a key index transmitted in the SCI.

In some aspects, the one or more parameters further comprise at least one of a PLMN or a zone ID associated with the first UE.

In some aspects, determining the sequence comprises: retrieving the sequence, from a table of sequences preconfigured for the at least one of the PLMN or zone ID, using the key index.

In some aspects, the one or more parameters further comprises a source ID of the second UE and a subchannel used for transmitting the PSSCH.

In some aspects, determining the sequence for providing feedback comprises: determining a base sequence of length n as a function of at least one of the source ID or the key index; and cyclically shifting the base sequence as a function of at least one of the source ID or the key index.

In some aspects, the first UE is a member of a groupcast session; and the one or more parameters comprises a group ID of the groupcast session.

In some aspects, the one or more parameters further comprises a key index transmitted in the SCI.

In some aspects, determining the sequence for providing feedback comprises: determining a base sequence of length n as a function of at least one of the group ID or the key index; and cyclically shifting the base sequence as a function of at least one or the group ID or the key index.

In some aspects, a subset of bits of a source ID and destination ID are transmitted in the SCI; and the one or more parameters comprises one or more bits of the source or destination ID that are not transmitted in the SCI.

In some aspects, the one or more parameters comprise: a key index transmitted in the SCI; and a shared sidelink key derived based on one or more random numbers generated by the second UE.

In some aspects, the one or more parameters comprise: a key index transmitted in the SCI; and a shared sidelink key derived based on one or more random numbers generated by a third UE.

Figure 14:
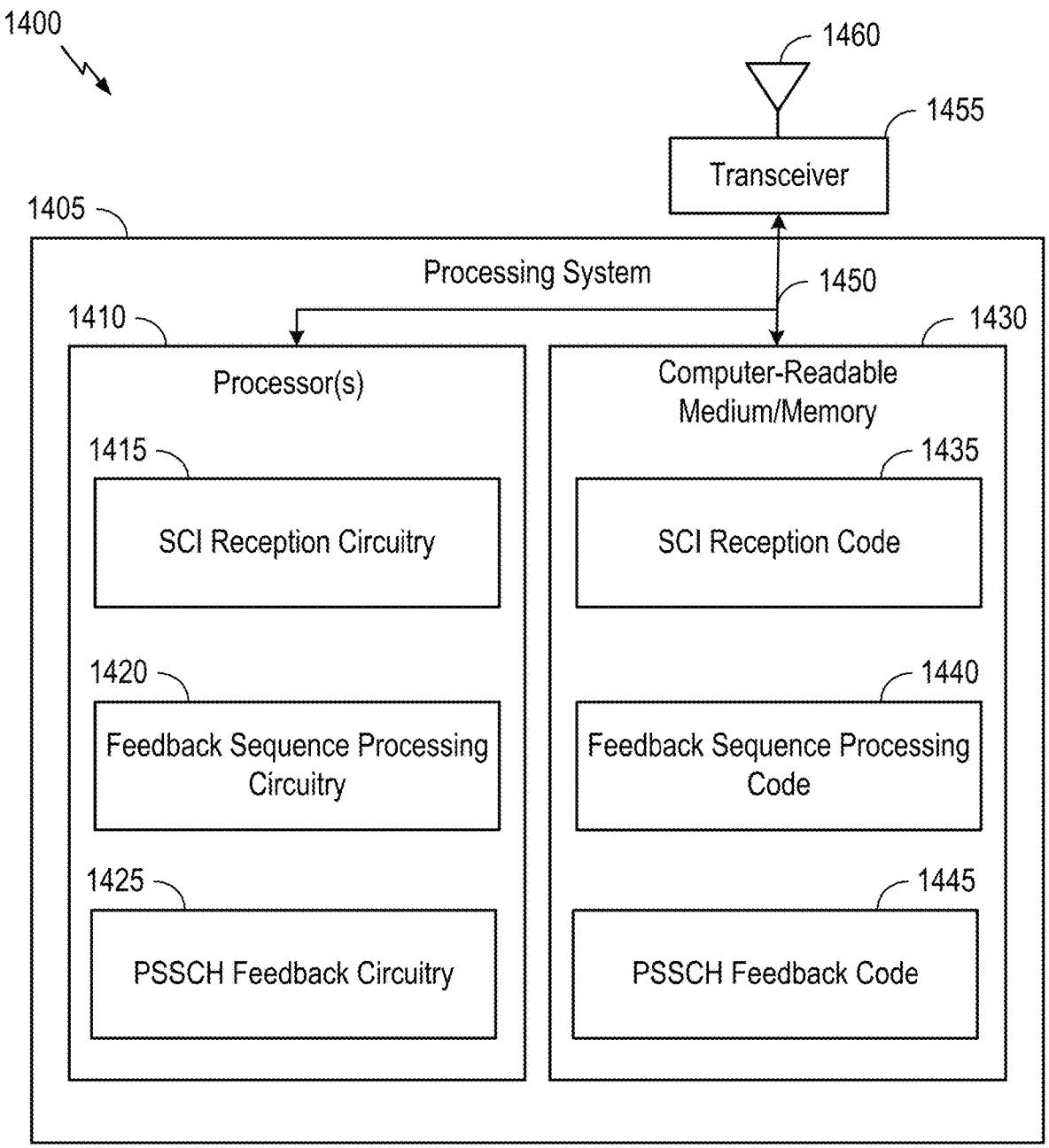
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Figure 13:
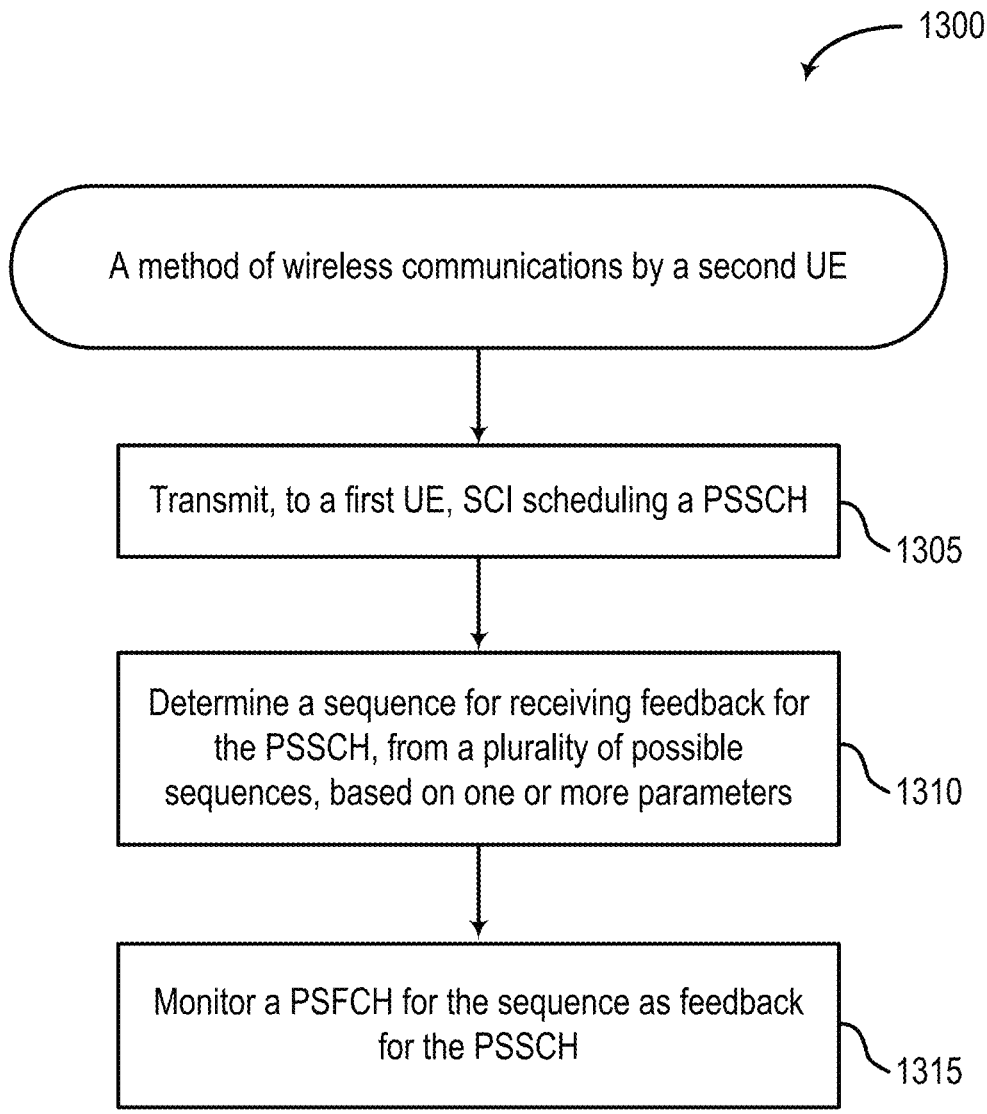
FIG. 13 depicts a method for wireless communications.

FIG. 13 shows a method 1300 for wireless communications by a second UE, such as UE 104 of FIGS. 1 and 3.

Method 1300 begins at 1305 with transmitting, to a first UE, SCI scheduling a PSSCH. In some cases, the operations of this step refer to, or may be performed by, SCI transmission circuitry and/or SCI transmission code as described with reference to FIG. 15.

Method 1300 then proceeds to step 1310 with determining a sequence for receiving feedback for the PSSCH, from a plurality of possible sequences, based on one or more parameters. In some cases, the operations of this step refer to, or may be performed by, a feedback sequence processing circuitry and/or feedback sequence processing code as described with reference to FIG. 15.

Method 1300 then proceeds to step 1315 with monitoring a PSFCH for the sequence as feedback for the PSSCH. In some cases, the operations of this step refer to, or may be performed by, PSFCH monitoring circuitry and/or PSFCH monitoring code as described with reference to FIG. 15.

In some aspects, a sequence provided as negative acknowledgment feedback for the PSSCH is a cyclically shifted version of a sequence provided as positive acknowledgment feedback for the PSSCH.

In some aspects, the one or more parameters comprises a key index transmitted in the SCI.

In some aspects, the one or more parameters further comprise at least one of a PLMN or a zone ID associated with the first UE.

In some aspects, determining the sequence comprises: retrieving the sequence, from a table of sequences preconfigured for the at least one of the PLMN or zone ID, using the key index.

In some aspects, the one or more parameters further comprises a source ID of the second UE and a subchannel used for transmitting the PSSCH.

In some aspects, determining the sequence for providing feedback comprises: determining a base sequence of length n as a function of at least one of the source ID or the key index; and cyclically shifting the base sequence as a function of at least one of the source ID or the key index.

In some aspects, the first UE is a member of a groupcast session; and the one or more parameters comprises a group ID of the groupcast session.

In some aspects, the one or more parameters further comprises a key index transmitted in the SCI.

In some aspects, determining the sequence for providing feedback comprises: determining a base sequence of length n as a function of at least one of the group ID or the key index; and cyclically shifting the base sequence as a function of at least one or the group ID or the key index.

In some aspects, a subset of bits of a source ID and destination ID are transmitted in the SCI; and the one or more parameters comprises one or more bits of the source or destination ID that are not transmitted in the SCI.

In some aspects, the one or more parameters comprise: a key index transmitted in the SCI; and a shared sidelink key derived based on one or more random numbers generated by the second UE.

In some aspects, the one or more parameters comprise: a key index transmitted in the SCI; and a shared sidelink key derived based on one or more random numbers generated by a third UE.

Figure 15:
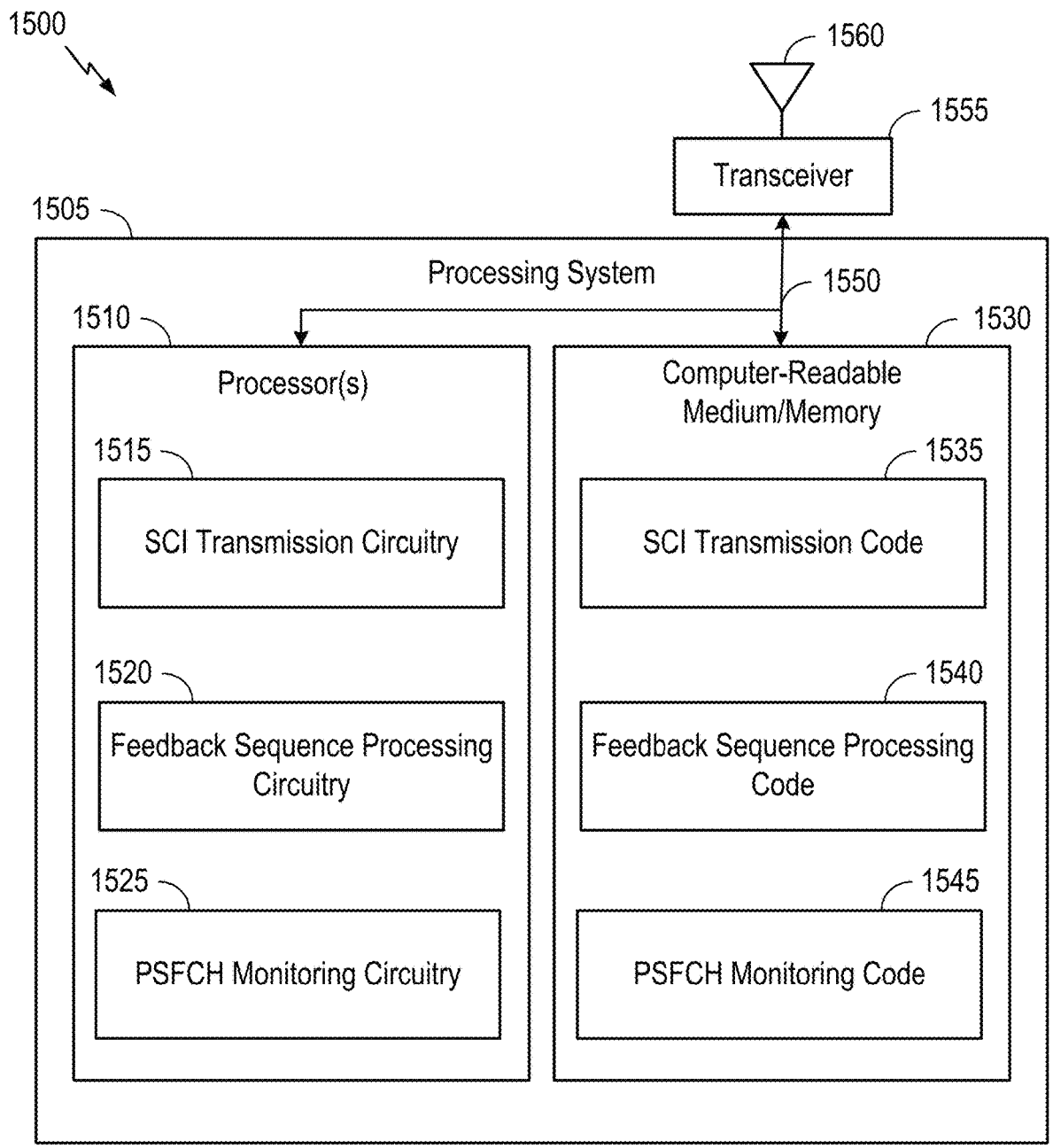
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a first user equipment, such as UE 104 described above with respect to FIGS. 1 and 3.

The communications device 1400 includes a processing system 1405 coupled to the transceiver 1455 (e.g., a transmitter and/or a receiver). The transceiver 1455 is configured to transmit and receive signals for the communications device 1400 via the antenna 1460, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. The one or more processors 1410 are coupled to a computer-readable medium/memory 1430 via a bus 1450. In certain aspects, the computer-readable medium/memory 1430 is configured to store instructions (e.g., computer-executable code) that when executed by the one or more processors 1410, cause the one or more processors 1410 to perform the method 1200 described with respect to FIG. 12, or any aspect related to it. Note that reference to a processor performing a function of communications device 1400 may include one or more processors 1410 performing that function of communications device 1400.

In the depicted example, computer-readable medium/memory 1430 stores code (e.g., executable instructions), such as SCI reception code 1435, feedback sequence processing code 1440, and PSSCH feedback code 1445. Processing of the SCI reception code 1435, feedback sequence processing code 1440, and PSSCH feedback code 1445 may cause the communications device 1400 to perform the method 1200 described with respect to FIG. 12, or any aspect related to it.

The one or more processors 1410 include circuitry configured to implement (e.g., execute) the code stored in the computer-readable medium/memory 1430, including circuitry such as SCI reception circuitry 1415, feedback sequence processing circuitry 1420, and PSSCH feedback circuitry 1425. Processing with SCI reception circuitry 1415, feedback sequence processing circuitry 1420, and PSSCH feedback circuitry 1425 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1455 and the antenna 1460 of the communications device 1400 in FIG. 14. Means for receiving or obtaining may include transceivers 354 and/or antenna(s) 352 of the UE 104 illustrated in FIG. 3 and/or the transceiver 1455 and the antenna 1460 of the communications device 1400 in FIG. 14.

FIG. 15 depicts aspects of an example communications device 1500. In some aspects, communications device 1500 is a second user equipment, such as UE 104 described above with respect to FIGS. 1 and 3.

The communications device 1500 includes a processing system 1505 coupled to the transceiver 1555 (e.g., a transmitter and/or a receiver). The transceiver 1555 is configured to transmit and receive signals for the communications device 1500 via the antenna 1560, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1530 via a bus 1550. In certain aspects, the computer-readable medium/memory 1530 is configured to store instructions (e.g., computer-executable code) that when executed by the one or more processors 1510, cause the one or more processors 1510 to perform the method 1300 described with respect to FIG. 13, or any aspect related to it. Note that reference to a processor performing a function of communications device 1500 may include one or more processors 1510 performing that function of communications device 1500.

In the depicted example, computer-readable medium/memory 1530 stores code (e.g., executable instructions), such as SCI transmission code 1535, feedback sequence processing code 1540, and PSFCH monitoring code 1545. Processing of the SCI transmission code 1535, feedback sequence processing code 1540, and PSFCH monitoring code 1545 may cause the communications device 1500 to perform the method 1300 described with respect to FIG. 13, or any aspect related to it.

The one or more processors 1510 include circuitry configured to implement (e.g., execute) the code stored in the computer-readable medium/memory 1530, including circuitry such as SCI transmission circuitry 1515, feedback sequence processing circuitry 1520, and PSFCH monitoring circuitry 1525. Processing with SCI transmission circuitry 1515, feedback sequence processing circuitry 1520, and PSFCH monitoring circuitry 1525 may cause the communications device 1500 to perform the method 1300 described with respect to FIG. 13, or any aspect related to it.

Various components of the communications device 1500 may provide means for performing the method 1300 described with respect to FIG. 13, or any aspect related to it. For example, means for transmitting, sending or outputting for transmission may include transceivers 354 and/or antenna(s) 352 of the UE 104 illustrated in FIG. 3 and/or the transceiver 1555 and the antenna 1560 of the communications device 1500 in FIG. 15. Means for receiving or obtaining may include transceivers 354 and/or antenna(s) 352 of the UE 104 illustrated in FIG. 3 and/or the transceiver 1555 and the antenna 1560 of the communications device 1500 in FIG. 15.

Example Clauses

Implementation examples are described in the following numbered clauses:

Clause 1: A method for wireless communication at a first UE comprising: receiving, from a second UE, SCI scheduling a PSSCH; determining a sequence for providing feedback for the PSSCH, from a plurality of possible sequences, based on one or more parameters; and transmitting the sequence via a PSFCH as feedback for the PSSCH.

Clause 2: The method of Clause 1, wherein a sequence provided as negative acknowledgment feedback for the PSSCH is a cyclically shifted version of a sequence provided as positive acknowledgment feedback for the PSSCH.

Clause 3: The method of any one of Clauses 1 and 2, wherein the one or more parameters comprises a key index transmitted in the SCI.

Clause 4: The method of Clause 3, wherein the one or more parameters further comprise at least one of a PLMN or a zone ID associated with the first UE.

Clause 5: The method of Clause 4, wherein determining the sequence comprises: retrieving the sequence, from a table of sequences preconfigured for the at least one of the PLMN or zone ID, using the key index.

Clause 6: The method of Clause 3, wherein the one or more parameters further comprises a source ID of the second UE and a subchannel used for transmitting the PSSCH.

Clause 7: The method of Clause 6, wherein determining the sequence for providing feedback comprises: determining a base sequence of length n as a function of at least one of the source ID or the key index; and cyclically shifting the base sequence as a function of at least one of the source ID or the key index.

Clause 8: The method of any one of Clauses 1-7, wherein: the first UE is a member of a groupcast session; and the one or more parameters comprises a group ID of the groupcast session.

Clause 9: The method of Clause 8, wherein the one or more parameters further comprises a key index transmitted in the SCI.

Clause 10: The method of Clause 9, wherein determining the sequence for providing feedback comprises: determining a base sequence of length n as a function of at least one of the group ID or the key index; and cyclically shifting the base sequence as a function of at least one or the group ID or the key index.

Clause 11: The method of any one of Clauses 1-10, wherein: a subset of bits of a source ID and destination ID are transmitted in the SCI; and the one or more parameters comprises one or more bits of the source or destination ID that are not transmitted in the SCI.

Clause 12: The method of any one of Clauses 1-11, wherein the one or more parameters comprise: a key index transmitted in the SCI; and a shared sidelink key derived based on one or more random numbers generated by the second UE.

Clause 13: The method of any one of Clauses 1-12, wherein the one or more parameters comprise: a key index transmitted in the SCI; and a shared sidelink key derived based on one or more random numbers generated by a third UE.

Clause 14: A method for wireless communication at a second UE comprising: transmitting, to a first UE, SCI scheduling a PSSCH; determining a sequence for receiving feedback for the PSSCH, from a plurality of possible sequences, based on one or more parameters; and monitoring a PSFCH for the sequence as feedback for the PSSCH.

Clause 15: The method of Clause 14, wherein a sequence provided as negative acknowledgment feedback for the PSSCH is a cyclically shifted version of a sequence provided as positive acknowledgment feedback for the PSSCH.

Clause 16: The method of any one of Clauses 14 and 15, wherein the one or more parameters comprises a key index transmitted in the SCI.

Clause 17: The method of Clause 16, wherein the one or more parameters further comprise at least one of a PLMN or a zone ID associated with the first UE.

Clause 18: The method of Clause 17, wherein determining the sequence comprises: retrieving the sequence, from a table of sequences preconfigured for the at least one of the PLMN or zone ID, using the key index.

Clause 19: The method of Clause 16, wherein the one or more parameters further comprises a source ID of the second UE and a subchannel used for transmitting the PSSCH.

Clause 20: The method of Clause 19, wherein determining the sequence for providing feedback comprises: determining a base sequence of length n as a function of at least one of the source ID or the key index; and cyclically shifting the base sequence as a function of at least one of the source ID or the key index.

Clause 21: The method of any one of Clauses 14-20, wherein: the first UE is a member of a groupcast session; and the one or more parameters comprises a group ID of the groupcast session.

Clause 22: The method of Clause 21, wherein the one or more parameters further comprises a key index transmitted in the SCI.

Clause 23: The method of Clause 22, wherein determining the sequence for providing feedback comprises: determining a base sequence of length n as a function of at least one of the group ID or the key index; and cyclically shifting the base sequence as a function of at least one or the group ID or the key index.

Clause 24: The method of any one of Clauses 14-23, wherein: a subset of bits of a source ID and destination ID are transmitted in the SCI; and the one or more parameters comprises one or more bits of the source or destination ID that are not transmitted in the SCI.

Clause 25: The method of any one of Clauses 14-24, wherein the one or more parameters comprise: a key index transmitted in the SCI; and a shared sidelink key derived based on one or more random numbers generated by the second UE.

Clause 26: The method of any one of Clauses 14-25, wherein the one or more parameters comprise: a key index transmitted in the SCI; and a shared sidelink key derived based on one or more random numbers generated by a third UE.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first user equipment (UE) comprising:
   receiving, from a second UE, sidelink control information (SCI) scheduling a physical sidelink shared channel (PSSCH);
   determining a sequence for providing feedback for the PSSCH, from a plurality of possible sequences, based on one or more parameters that comprise a key index transmitted in the SCI, wherein the one or more parameters further comprise a source identifier (source ID) of the second UE and a subchannel used for transmitting the PSSCH, and wherein determining the sequence for providing feedback comprises:
      determining a base sequence of length n as a function of at least one of the source ID or the key index; and
      cyclically shifting the base sequence as a function of at least one of the source ID or the key index; and
   transmitting the sequence via a physical sidelink feedback channel (PSFCH) as feedback for the PSSCH.

2. The method of claim 1, wherein a sequence provided as negative acknowledgment feedback for the PSSCH is a cyclically shifted version of a sequence provided as positive acknowledgment feedback for the PSSCH.

3. The method of claim 1, wherein the one or more parameters further comprise at least one of a public land mobile network (PLMN) or a zone identifier (zone ID) associated with the first UE.

4. The method of claim 3, wherein determining the sequence comprises:
   retrieving the sequence, from a table of sequences preconfigured for the at least one of the PLMN or zone ID, using the key index.

5. The method of claim 1, wherein:
   a subset of bits of a source ID and destination ID are transmitted in the SCI; and
   the one or more parameters further comprise one or more bits of the source or destination ID that are not transmitted in the SCI.

6. The method of claim 1, wherein the one or more parameters further comprise:
   a shared sidelink key derived based on one or more random numbers generated by the second UE.

7. The method of claim 1, wherein the one or more parameters further comprise:
   a shared sidelink key derived based on one or more random numbers generated by a third UE.

8. A method for wireless communication at a second user equipment (UE) comprising:

transmitting, to a first UE, sidelink control information (SCI) scheduling a physical sidelink shared channel (PSSCH);
determining a sequence for receiving feedback for the PSSCH, from a plurality of possible sequences, based on one or more parameters that comprise a key index transmitted in the SCI, wherein the one or more parameters further comprises a source identifier (source ID) of the second UE and a subchannel used for transmitting the PSSCH, and wherein determining the sequence for providing feedback comprises:
determining a base sequence of length n as a function of at least one of the source ID or the key index; and
cyclically shifting the base sequence as a function of at least one of the source ID or the key index; and
monitoring a physical sidelink feedback channel (PSFCH) for the sequence as feedback for the PSSCH.

9. The method of claim 8, wherein a sequence provided as negative acknowledgment feedback for the PSSCH is a cyclically shifted version of a sequence provided as positive acknowledgment feedback for the PSSCH.

10. The method of claim 8, wherein the one or more parameters further comprise at least one of a public land mobile network (PLMN) or a zone identifier (zone ID) associated with the first UE.

11. The method of claim 10, wherein determining the sequence comprises:
retrieving the sequence, from a table of sequences preconfigured for the at least one of the PLMN or zone ID, using the key index.

12. The method of claim 8, wherein:
a subset of bits of a source ID and destination ID are transmitted in the SCI; and
the one or more parameters comprises one or more bits of the source or destination ID that are not transmitted in the SCI.

13. The method of claim 8, wherein the one or more parameters further comprise:
a shared sidelink key derived based on one or more random numbers generated by the second UE.

14. The method of claim 8, wherein the one or more parameters further comprise:
a shared sidelink key derived based on one or more random numbers generated by a third UE.

15. A user equipment (UE) configured for wireless communication, comprising:
memory; and
one or more processors configured, individually or collectively, to cause the UE to:
receive, from a second UE, sidelink control information (SCI) scheduling a physical sidelink shared channel (PSSCH);
determine a sequence for providing feedback for the PSSCH, from a plurality of possible sequences, based on one or more parameters that comprise a key index transmitted in the SCI, wherein the one or more parameters further comprise a source identifier (source ID) of the second UE and a subchannel used for transmitting the PSSCH, and wherein to determine the sequence for providing feedback, the one or more processors are configured, individually or collectively, to cause the UE to:
determine a base sequence of length n as a function of at least one of the source ID or the key index; and
cyclically shift the base sequence as a function of at least one of the source ID or the key index; and
transmit the sequence via a physical sidelink feedback channel (PSFCH) as feedback for the PSSCH.

16. A second user equipment (UE) configured for wireless communication, comprising:
memory; and
one or more processors configured, individually or collectively, to cause the second UE to:
transmit, to a first UE, sidelink control information (SCI) scheduling a physical sidelink shared channel (PSSCH);
determine a sequence for receiving feedback for the PSSCH, from a plurality of possible sequences, based on one or more parameters that comprise a key index transmitted in the SCI, wherein the one or more parameters further comprise a source identifier (source ID) of the second UE and a subchannel used for transmitting the PSSCH, and wherein to determine the sequence for providing feedback, the one or more processors are configured, individually or collectively, to cause the UE to:
determine a base sequence of length n as a function of at least one of the source ID or the key index; and
cyclically shift the base sequence as a function of at least one of the source ID or the key index; and
monitor a physical sidelink feedback channel (PSFCH) for the sequence as feedback for the PSSCH.

17. A user equipment (UE) configured for wireless communication, comprising:
memory; and
one or more processors configured, individually or collectively, to cause the UE to:
receive, from a second UE, sidelink control information (SCI) scheduling a physical sidelink shared channel (PSSCH);
determine a sequence for providing feedback for the PSSCH, from a plurality of possible sequences, based on one or more parameters that comprise a key index transmitted in the SCI, wherein the UE is a member of a groupcast session, wherein the one or more parameters further comprise a group identifier (group ID) of the groupcast session, and wherein to determine the sequence for providing feedback, the one or more processors are configured, individually or collectively, to:
determine a base sequence of length n as a function of at least one of the group ID or the key index; and
cyclically shift the base sequence as a function of at least one or the group ID or the key index; and
transmit the sequence via a physical sidelink feedback channel (PSFCH) as feedback for the PSSCH.

18. A second user equipment (UE) configured for wireless communication, comprising:
memory; and
one or more processors configured, individually or collectively, to cause the second UE to:
transmit, to a first UE, sidelink control information (SCI) scheduling a physical sidelink shared channel (PSSCH);
determine a sequence for receiving feedback for the PSSCH, from a plurality of possible sequences, based on one or more parameters that comprise a key index transmitted in the SCI, wherein the second UE is a member of a groupcast session, wherein the one or more parameters further comprise a group identifier (group ID) of the groupcast session, and wherein to determine the sequence for providing feedback, the one or more processors are configured, individually or collectively, to:
    determine a base sequence of length n as a function of at least one of the group ID or the key index; and
    cyclically shift the base sequence as a function of at least one or the group ID or the key index; and
    monitor a physical sidelink feedback channel (PSFCH) for the sequence as feedback for the PSSCH.

19. A method for wireless communication at a first user equipment (UE) comprising:
    receiving, from a second UE, sidelink control information (SCI) scheduling a physical sidelink shared channel (PSSCH);
    determining a sequence for providing feedback for the PSSCH, from a plurality of possible sequences, based on one or more parameters that comprise a key index transmitted in the SCI, wherein:
        the first UE is a member of a groupcast session;
        the one or more parameters further comprise a group identifier (group ID) of the groupcast session; and
        determining the sequence for providing feedback comprises:
            determining a base sequence of length n as a function of at least one of the group ID or the key index; and
            cyclically shifting the base sequence as a function of at least one or the group ID or the key index; and
    transmitting the sequence via a physical sidelink feedback channel (PSFCH) as feedback for the PSSCH.

20. The method of claim 19, wherein a sequence provided as negative acknowledgment feedback for the PSSCH is a cyclically shifted version of a sequence provided as positive acknowledgment feedback for the PSSCH.

21. The method of claim 19, wherein the one or more parameters further comprise at least one of a public land mobile network (PLMN) or a zone identifier (zone ID) associated with the first UE.

22. The method of claim 21, wherein determining the sequence comprises:
    retrieving the sequence, from a table of sequences preconfigured for the at least one of the PLMN or zone ID, using the key index.

23. A method for wireless communication at a second user equipment (UE) comprising:
    transmitting, to a first UE, sidelink control information (SCI) scheduling a physical sidelink shared channel (PSSCH);
    determining a sequence for receiving feedback for the PSSCH, from a plurality of possible sequences, based on one or more parameters that comprise a key index transmitted in the SCI, wherein:
        the first UE is a member of a groupcast session;
        the one or more parameters further comprise a group identifier (group ID) of the groupcast session; and
        determining the sequence for providing feedback comprises:
            determining a base sequence of length n as a function of at least one of the group ID or the key index; and
            cyclically shifting the base sequence as a function of at least one or the group ID or the key index; and
    monitoring a physical sidelink feedback channel (PSFCH) for the sequence as feedback for the PSSCH.

24. The method of claim 23, wherein a sequence provided as negative acknowledgment feedback for the PSSCH is a cyclically shifted version of a sequence provided as positive acknowledgment feedback for the PSSCH.

25. The method of claim 23, wherein the one or more parameters further comprise at least one of a public land mobile network (PLMN) or a zone identifier (zone ID) associated with the first UE.

26. The method of claim 25, wherein determining the sequence comprises:
    retrieving the sequence, from a table of sequences preconfigured for the at least one of the PLMN or zone ID, using the key index.

* * * * *